United States Patent
Tang

(10) Patent No.: US 9,507,157 B2
(45) Date of Patent: Nov. 29, 2016

(54) SIZE-ADJUSTABLE ELLIPTICAL LASER MARKER

(71) Applicant: Zhen Tang, Plainsboro, NJ (US)

(72) Inventor: Zhen Tang, Plainsboro, NJ (US)

(*) Notice: Subject to any disclaimer, the term of this patent is extended or adjusted under 35 U.S.C. 154(b) by 225 days.

(21) Appl. No.: 14/573,338

(22) Filed: Dec. 17, 2014

(65) Prior Publication Data

US 2016/0178918 A1    Jun. 23, 2016

(51) Int. Cl.
*G02B 27/20* (2006.01)
*G02B 26/08* (2006.01)

(52) U.S. Cl.
CPC ........... *G02B 27/20* (2013.01); *G02B 26/0883* (2013.01)

(58) Field of Classification Search
CPC .......................... G02B 26/0883; G02B 27/20
See application file for complete search history.

(56) References Cited

U.S. PATENT DOCUMENTS

| | | | |
|---|---|---|---|
| 4,822,974 A * | 4/1989 | Leighton | B23K 26/0652 219/121.67 |
| 5,299,183 A * | 3/1994 | Yamaguchi | G11B 7/08582 369/44.14 |
| 5,400,514 A | 3/1995 | Imbrie et al. | |
| 5,450,148 A | 9/1995 | Shu et al. | |
| 5,926,867 A | 7/1999 | Buchanan | |
| 5,938,308 A | 8/1999 | Feldman et al. | |
| 6,000,813 A | 12/1999 | Krietzman | |
| 6,022,126 A | 2/2000 | Sekine et al. | |
| 6,789,922 B2 | 9/2004 | Lin | |
| 7,009,141 B1 * | 3/2006 | Wool | B23K 26/082 219/121.73 |
| 7,287,862 B2 | 10/2007 | Yavid | |
| 7,331,137 B2 | 2/2008 | Hsu | |
| 7,380,722 B2 | 6/2008 | Harley et al. | |
| 7,971,790 B2 | 7/2011 | Hung et al. | |
| 7,997,742 B2 | 8/2011 | Stern et al. | |
| 8,100,540 B2 | 1/2012 | Huebner | |
| 8,159,501 B2 | 4/2012 | Rao | |
| 8,896,899 B1 | 11/2014 | Tang | |
| 2010/0165307 A1 | 7/2010 | Mitzushima et al. | |
| 2014/0340725 A1 * | 11/2014 | Tang | G02B 27/20 359/221.2 |
| 2015/0076125 A1 * | 3/2015 | Toyosawa | B01J 19/12 219/121.73 |

FOREIGN PATENT DOCUMENTS

CN             202123322 U * 1/2012

* cited by examiner

*Primary Examiner* — Charlie Y Peng

(57) ABSTRACT

A laser marker/pointer for projecting size-adjustable circular or elliptical laser beam patterns onto a target surface such as a portion of a presentation screen or to assist in the aiming of a firearm, comprises a handheld shell body in which is mounted a laser light source, a rotating wedge prism driven by an electric motor through a belt pulley or a gear system, two convex lenses, a DC power unit, and a mechanical and electric control unit. The rotating wedge prism is placed between the two convex lenses to refract the laser beam into an opening-angle adjustable hollow light cone. The projection of the hollow light cone onto a target surface generates circular or elliptical tracing patterns. The mechanical and electric control unit controls the laser pattern generation and its size adjustment through driving the wedge prism rotation around the emitted laser beam direction and its linear movement along the beam direction. The position of the wedge prism along the original emitted laser direction determines the size of the circular or elliptical pattern. A push button switch controlling the power on and off of the device can be slid in two directions to either enlarge or reduce the size of the generated pattern.

10 Claims, 4 Drawing Sheets

SIZE-ADJUSTABLE ELLIPTICAL LASER MARKER

CROSS-REFERENCE TO RELATED APPLICATIONS

The present application is related to U.S. Pat. No. 8,896,899, filed May 15, 2013. The entire disclosure of that application is expressly incorporated herein by reference.

FIELD OF THE INVENTION

This invention generally relates to laser pointers, and more specifically to improved laser markers that are capable of projecting size-adjustable elliptical illumination patterns. The pattern size can be continuously changed. With the present invention, an individual can adaptively adjust and control the size of an elliptical pattern to precisely fit and highlight the intended portion on a target, for example, a projection screen.

BACKGROUND OF THE INVENTION

In conference and meeting presentations, a presenter often uses a laser pointer to illuminate and highlight portions of a projected viewgraph or slide presentation so that an associated oral message can be better understood by the audience. The conventional laser pointer projects only a small bright spot. The typically small-sized spot is difficult to be distinguished when projected upon a large screen. Another disadvantage for a laser pointer often is the brightness of the spot, so that can make viewers very uncomfortable if their eyes inadvertently focus on the spot.

An illuminated spot may also be used to assist in the aiming of a firearm for improving targeting accuracy during hunting. The small size of the laser mark can also be a disadvantage as it is difficult to be noticed far away.

A few modified laser pointers have been developed. For example, U.S. Pat. No. 5,450,148 uses a set of selectable masks to filter a magnified laser output into a desired pattern. U.S. Pat. No. 5,400,514 teaches a way to create light geometric tracing through moving a light source in one or two dimensions. Refer to U.S. Pat. No. 6,789,922, a transverse columnar faceted lens is used to refract a laser beam into a cross-shaped beam laser ray. U.S. Pat. No. 5,938,308 teaches the usage of a plastic holographic optical element or a diffractive optical element for projecting light into an image on a remote target. U.S. Pat. No. 7,971,790 illustrates a laser pointer that its pattern and size of the projected image can be controlled by a human-machine interface. The image is produced by passing a laser beam through a light scanning device, such as a mirror. A frequency/phase control module and a driving energy control module control the movements of the light scanning device. The human-machine interface can be designed as a push button or rotary switch for users to select and operate the laser pointer. U.S. Pat. No. 8,896,899 creates circular or elliptical patterns through a laser beam reflection off a tilted rotating mirror. These modifications have clearly provided new optical patterns beyond a simple dot, making them easier for the audience to notice. However, none of the above solutions allow users to adaptively change the optical pattern size for precisely matching the physical dimension of the intended area of the informational contents, such as charts or texts, on a projection screen.

SUMMARY OF THE INVENTION

The primary object of this invention is to provide a laser pointer/marker that enables a user to adaptively control the size of a projected circular or elliptical pattern so that the projected pattern precisely covers the intended area of a target, such as a projection screen. With the assistance of this invention, a presenter can confidently and accurately circle the specific elements to assist his or her oral messages. The chance of potential confusions to which informational elements are referred in presentations is greatly reduced. The clarity and specificity of the projected laser patterns will facilitate a presenter to more effectively communicate complex information, for example, an engineering design system or a 3-D model, to a large audience. The same device may also be modified to assist a hunter as an auxiliary sight in aiming a target with a size-adjustable projected laser pattern.

In the preferred embodiment of the present invention, the device comprises a battery unit, a laser diode light source, a wedge prism, a pair of plano-convex lenses, and a mechanical and electronic control unit to determine the pattern size. A wedge prism is placed between the pair of plano-convex lenses. The selection of plano-convex lenses is not meant to be limiting. Other types of convex lenses may also be used. A coherent laser beam emitted from the laser diode is collimated and focused through the first plano-convex lens. The focused beam is then refracted through the wedge prism. The deviated beam after the wedge prism forms a fixed angle with the optical axis, which is defined by the original emitted diode laser beam direction. The deviated beam is re-collimated and further refracted by the second plano-convex lens. The second lens changes the beam deviation angle from the optical axis. As the wedge prism is rotated around the optical axis, the refracted light traces a hollow cone in the three dimensional space. As the output hollow light cone impinges on a target, such as a projection screen, a circular tracing is generated if the optical axis is perpendicular to the projection screen. The circular tracing changes to an elliptical shape as the optical axis departs from the perpendicular direction of the screen. The mechanical and electronic control unit determines the output pattern shape and size through the rotation of the wedge prism around the optical axis and the linear translational movement of the wedge prism along the optical axis. The location of the wedge prism relative to the pair of lenses along the optical axis determines the final output opening angle of the hollow light cone and thus the ensuing size of the circular or elliptical pattern. The pattern size on a projection screen can be continuously and precisely controlled by the wedge prism location relative to the pair of lenses. The pattern will be either enlarged or shrunk depending on the wedge prism moving direction. The ability to adaptively control the pattern size overcomes the limitations of the prior arts so that a presenter can accurately illuminate an appropriately sized circle or ellipse on an intended area of a projection screen for highlighting selected contents. The prior arts provide choices to select patterns or size of patterns but not the capability to precisely adjust the pattern size to cover a specific portion on a target.

BRIEF DESCRIPTION OF THE DRAWINGS

Various embodiments of the invention are described with reference to the drawings in which like items or components are identified by the same reference designation wherein.

DETAILED DESCRIPTION OF THE INVENTION

Figure 1:
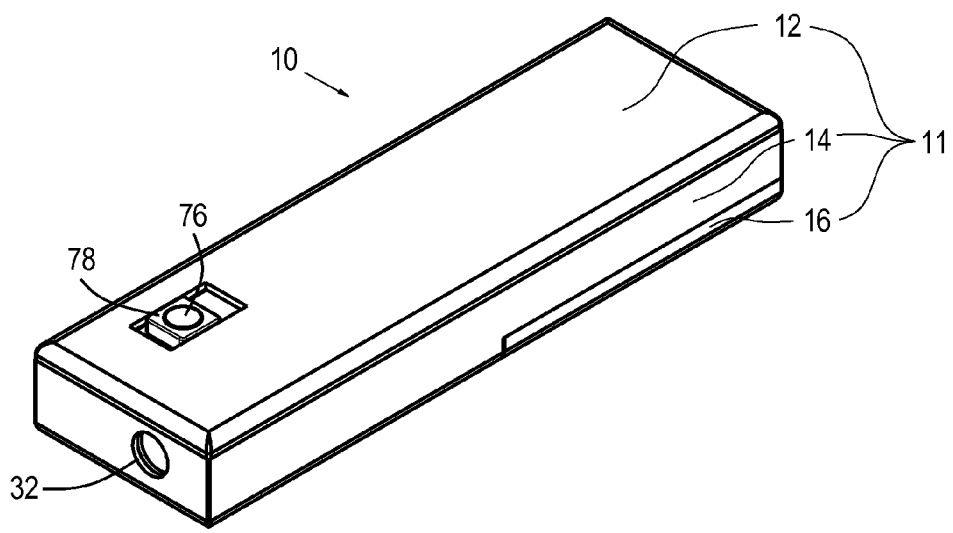
FIG. 1 is a perspective drawing of a preferred embodiment of the laser pointer/marker of the present invention.

FIG. 1 depicts the exterior perspective view of the preferred embodiment of a device 10 according to the present invention. A handheld housing or shell 11 comprises top cover 12, body cover 14, and battery cover 16. The top cover 12 has an opening slot on the cover surface. Within the slot, switch button 76 resides inside slider 78. The switch button 76 controls the power on and off for the device. Body cover 14 has circular orifice 32 through which the output circular or elliptical laser beam pattern is emitted. A user can slide the slider 78 with the attached switch button 76 to adaptively control the output pattern size. Shell body 11 is typically cuboid shaped with rounded edges but can also be designed with other more esthetically appealing curvy shapes.

Figure 2:
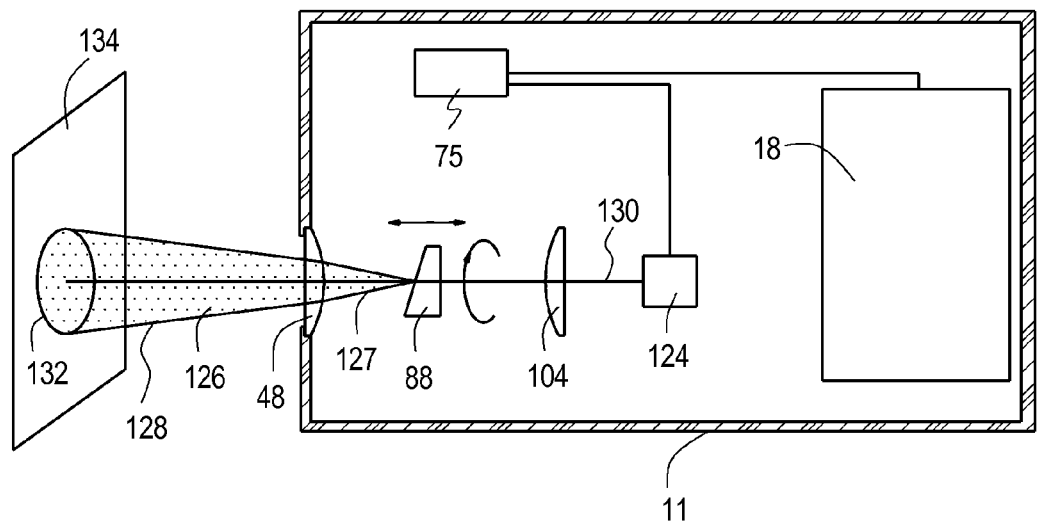
FIG. 2 is a schematic diagram of a representative embodiment showing the major components and system structure that generates a size-adjustable circular or elliptical laser pattern.

The high-level schematic and the operation of device 10 are shown in FIG. 2. Device 10 comprises shell body 11, battery unit 18, laser diode unit 124, two plano-convex lenses 104 and 48, wedge prism 88, and a mechanical and electric control unit 75.

Battery unit 18 can be either one battery or two sequentially connected batteries to provide electric power to drive the mechanical and electric control unit 75. The detailed design and operation of control unit 75 will be described in more details below. Laser diode unit 124 is powered by battery unit 18 through control unit 75. In an operable prototype of this invention, laser diode unit 124 uses a wavelength of 650 nm and 5 mW diode laser provided as a module that includes driver circuity (not shown) and its own collimation (not shown). The laser choice regarding its wavelength, power, or type, such as a diode laser and a diode pumped solid state laser, is not meant to be limiting. A coherent laser beam emitted from laser diode unit 124 is collimated and focused by plano-convex lens 104. The emitted laser beam direction defines optical axis 130 of the laser marker. Wedge prism 88 refracted and bent the collimated beam after plano-convex lens 104 into a deviated beam 127 which forms a fixed angle form optical axis 130. Beam 127 is further refracted and collimated by plano-convex lens 48 leading to a new beam path 128 which forms a different and adjustable angle from optical axis 130. As wedge prism 88 is rotated, light beams 127 and 128 are also revolved to generate a hollow light cone 126. When light cone 126 shines on screen 134, a circular pattern 132 is generated if optical axis 130 is perpendicular to screen 134. Pattern 132 changes to an elliptical form if optical axis 130 moves away from the perpendicular direction of screen 134. The size of the circular or elliptical pattern is precisely controlled by the position of wedge prism 88 relative to plano-convex lens 48. The output pattern can be either expanded or reduced by sliding wedge prism 88 along optical axis 130. The movement direction of wedge prism 88 determines whether the pattern is enlarged or reduced. The distance of wedge prism 88 from lens 48 controls the size of laser pattern 132 through adjusting the angle between beam 128 and optical axis 130. Wedge prism 88 can be positioned in various locations along optical axis 130 so that the size of laser pattern 132 can be adaptively and smoothly controlled to precisely cover the intended portion on screen 134.

Figure 3:
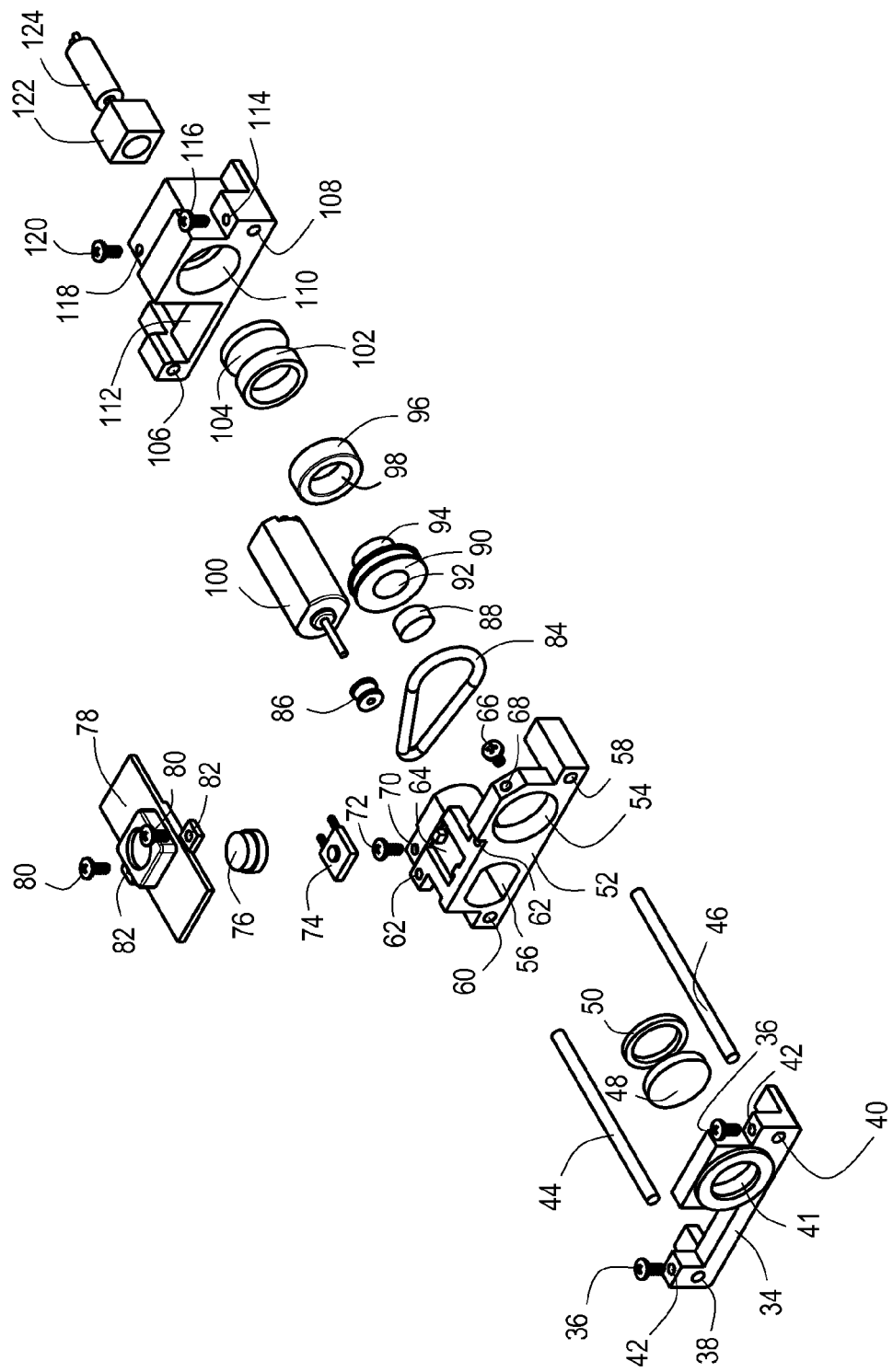
FIG. 3 is a detailed exploded view of the mechanical and electric control unit enabling the circular or elliptical illumination pattern creation and its size adjustment.
Figure 4:
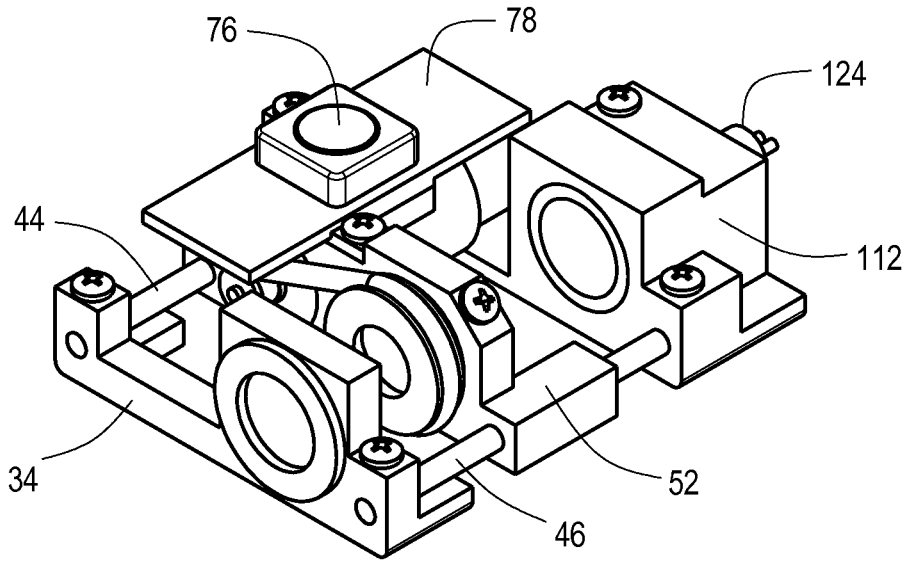
FIG. 4 shows the top/side/front perspective view of the assembled mechanical and electric control unit.
Figure 5:
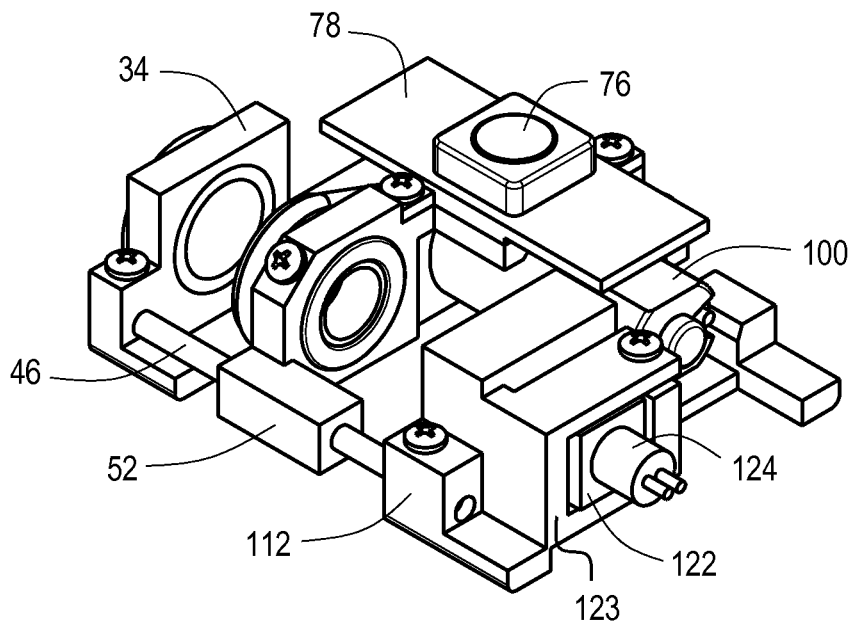
FIG. 5 shows the top/side/back perspective view of the assembled mechanical and electric control unit.

FIG. 3 provides a detailed exploded of all the parts for mechanical and electric control unit 75 with lenses 48 and 104. Two perspective views of the assembled unit 75, namely the top/side/front view and the top/side/back view, are shown in FIGS. 4 and 5. The invention will be better understood by combining these different views. Refer to FIG. 3, diode laser unit 124 is inserted into and affixed in the hole of mounting part 122. The mounting part 122 with the inserted laser unit 124 is placed in the rear section of lens frame 112. FIG. 5 provides a clearer view of how the laser unit 124, mounting part 122 and the lens frame 112 are assembled. The rear of lens frame 112 has a border 123 to receive and anchor mounting part 122. After the position and direction of mounting part 122 and diode laser unit 124 are manually adjusted for optimal alignment, screw 120 is threaded into matching hole 118 so that border 123 can tightly anchor mounting part 122 and diode laser unit 124 in place. The laser beam emitted from laser unit 124 defines the optical axis (shown in FIG. 2 but not in FIG. 3). Lens 104 is mounted in the front hole 110 of lens frame 112. Lens retaining ring 102 is used to secure lens 104 in lens frame 112. Lens frame 112 also contains a blind hole 106 and an open hole 108. Stainless steel rod 44 is securely mounted into the receiving blind hole 106. In a similar way, stainless steel rod 46 is inserted into the receiving open hole 108. The position of the stainless steel rod 46 in the open hole 108 can be changed until its final position to be secured by tightening screw 116 against rod 46. Wedge prism mounting frame 52 houses the parts that enable the rotation of wedge prism 88 around the optical axis as well as its linear movement along the optical axis. Wedge prism mounting frame 52 has round hole 54 for receiving miniature ball bearing 96. Miniature ball bearing 96 is secured in wedge prism mounting frame 52 by fastening screw 66 into matching hole 68. The outer hub 94 of prism pulley 90 is affixed to the matching inner ring 98 of miniature ball bearing 96. Wedge prism 88 is glued to the bore 92 of prism belt pulley 90. Motor pulley 86 is mounted on the shaft of electric motor 100. Electric motor 100 is slid into a shape matched receiving surface 56 of wedge prism mounting frame 52. The position of motor 100 can be adjusted before it is anchored by tightening screw 72 into hole 70. Belt 84 is attached to the grooves of motor pulley 86 and prism pulley 90. The rotations of motor pulley 86 driven by motor 100 is transferred to the rotations of prism pulley 90 and the rotation of the attached wedge prism 88 around the optical axis. Momentary tactile button switch 74 is placed on a receiving section 64 of wedge prism mounting frame 52. Switch button 76 is a human interface for switch 74. Switch 74 and switch button 76 are enclosed by slide 78 and the receiving section 64 of wedge prism mounting frame 52. Slider 78 is securely affixed to wedge prism mounting frame 52 by threading two screws 80 through its two anchoring holes 82 into two matching holes 62. Stainless steel rods 44 and 46 are respectively inserted into two opening holes 60 and 58 in wedge prism mounting frame 52. The direction of rods 44 and 46 is parallel to the optical axis, defined by the direction of emitted laser beam from laser diode unit 124. Wedge prism mounting frame 52 with the attached wedge prism 88 is constrained to move along the optical axis by the rods 44 and 46. The position of wedge prism 88 along the optical axis is controlled by the movement of the wedge prism mounting frame 52. A user can change and control the size of the output circular or elliptical pattern by varying the position of wedge prism 88 along the optical axis. Lens frame 34 mounts stainless steel rod 44, 46, and another plano-convex lens 48. The stainless steel rods 44 and 46 are inserted in open holes 38 and 40 in lens frame 34, respectively. The position of lens frame 34 relative to lens frame 112 can be manually adjusted until a perfect optical alignment is achieved. Two screws 36 are fastened into their respective matching holes 42, pushing them against the surfaces of rods 44 and 46, so that the final positions of lens frames 34 and 112 are affixed. Plano-convex lens 48 is mounted in hole 41 and further retained by lens ring 50.

FIG. 4 and FIG. 5 are two perspective views of the assembled mechanical and electric control unit 75. Wedge prism mounting frame 52 enables the rotational motion of wedge prism 88 around the optical axis and its linear motion along the optical axis (not shown in FIG. 4 and FIG. 5, shown in FIG. 2). This invention provides a compact and simple way to create a circular or elliptical laser pattern and to adaptively control its pattern size for emphasizing only the intended portion of a target, such as a projection screen.

Figure 6:
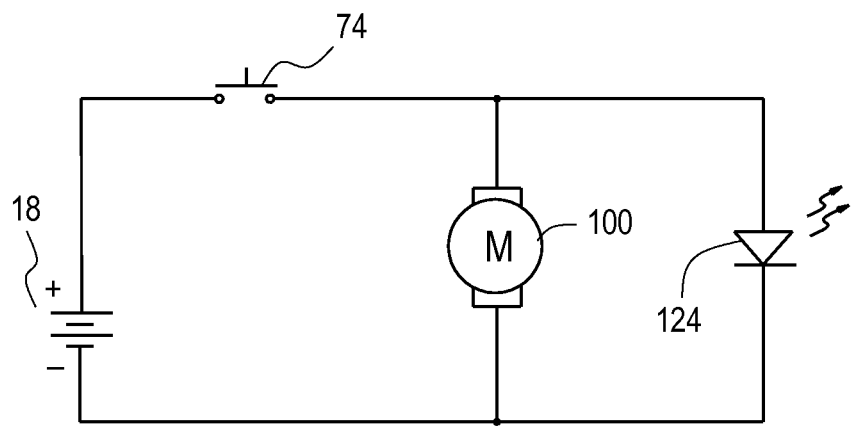
FIG. 6 illustrates the electric wiring diagram in the mechanical and electric control unit.

FIG. 6 illustrates the wiring details for mechanical and electric control unit 75. Battery unit 18 powers control unit 75. Momentary tactile button switch 74 controls the power on and off of electric motor 100 and diode laser unit 124.

In one alternative embodiment of the present invention, the mechanism to drive the rotation of wedge prism 88 changes from a pulley system to a gear system. Motor pulley 86, belt 84, and wedge prism pulley 90 are replaced by two spur gears while the operations of other parts remain the same as those of the preferred embodiment described above.

Although various embodiments of the invention have been shown and described, they are not meant to be limited to specific details. Those skilled in the art may recognize various modifications of these embodiments, which modifications are meant to be covered by the spirit and scope of the appended claims.

What is claimed is:

1. A laser beam marker for projecting a size-adjustable circular or elliptical pattern onto a receiving surface comprising:
    a housing having a frontmost aperture;
    a DC source of power supply in said housing;
    a laser beam generating device mounted in said housing;
    a pair of convex lenses mounted in said housing;
    a wedge prism placed between the pair of convex lenses; and
    a mechanical and electronic control unit to drive the rotational movement of the wedge prism around the emitted laser beam direction and its linear movement along the laser beam direction, wherein the control unit contains a wedge prism mounting frame that enables the wedge prism to be rotated by a belt pulley or a gear mechanism, an electric motor with a rotating shaft, two lens holding frames, a pair of rods affixed to the two lens holding frames that permits the wedge prism mounting frame to be linearly slid along the pair of rods, and an electric switch for connecting the DC source of power supply with the electric motor and the laser beam generating device.

2. The device of claim 1, wherein said electric switch is a momentary tactile button switch that is mounted on the wedge prism mounting frame.

3. The device of claim 2, wherein said electric switch controls the power on and off of the device.

4. The device of claim 3, wherein said electric switch is connected with a positive DC power supply terminal and the positive wire leads of said electric motor and said laser beam generating device, and the negative wire leads of said electric motor and said laser beam are connected to the ground of the DC power supply.

5. The device of claim 1, wherein said electric motor drives two belt-pulleys or two gears to transfer the motor rotations into the rotations of another belt pulley or gear pulley, wherein said wedge prism is affixed in the bore of said another belt pulley or gear pulley, and wherein said motor and said two belt pulleys or said two gears are mounted in said wedge prism mounting frame.

6. The device of claim 5, wherein said belt pulley or said gear containing the affixed wedge prism is further connected to the wedge prism mounting frame through a ball bearing, and wherein ball bearing reduces noises and ensures that the rotation of said wedge prism is kept perpendicular to the emitted laser beam direction.

7. The device of claim 1, wherein said wedge prism mounting frame contains two holes for constraining said wedge prism movement along the axial direction of said pair of rods inserted in the two holes, and wherein the linear movement and position of said wedge prism mounting frame and said wedge prism along the rods control the final size of the generated circular or elliptical patterns.

8. The device of claim 7, wherein said pair of rods are aligned to be parallel to the direction of the emitted laser direction, and wherein the rods are anchored to said device shell body through the mounting frames of said two convex lenses.

9. The device of claim 1, wherein the DC source of power supply comprises at least one regular or rechargeable battery.

10. The device of claim 1, wherein said pair of convex lenses are optically aligned to ensure that the refracted and deviated laser beam remains in a collimated state, and wherein the output circular or elliptical patterns are focused and sharp on a target.

* * * * *